(12) United States Patent
Darooka

(10) Patent No.: US 8,789,797 B2
(45) Date of Patent: Jul. 29, 2014

(54) PAYLOAD ADAPTERS INCLUDING ANTENNA ASSEMBLIES, SATELLITE ASSEMBLIES AND RELATED SYSTEMS AND METHODS

(75) Inventor: Dilip K. Darooka, West Chester, PA (US)

(73) Assignee: Alliant Techsystems Inc., Arlington, VA (US)

( * ) Notice: Subject to any disclaimer, the term of this patent is extended or adjusted under 35 U.S.C. 154(b) by 66 days.

(21) Appl. No.: 13/403,106

(22) Filed: Feb. 23, 2012

(65) Prior Publication Data

US 2013/0221162 A1 Aug. 29, 2013

(51) Int. Cl.
*B64G 1/10* (2006.01)
*B64G 1/64* (2006.01)

(52) U.S. Cl.
USPC ............... 244/173.1; 244/173.3; 244/159.6; 244/159.4

(58) Field of Classification Search
USPC .......... 244/173.1, 173.2, 173.3, 159.4, 159.6, 244/171.3; 343/DIG. 2
See application file for complete search history.

(56) References Cited

U.S. PATENT DOCUMENTS

| | | | |
|---|---|---|---|
| 4,896,847 A | 1/1990 | Gertsch | |
| 5,152,482 A | 10/1992 | Perkins | |
| 5,271,582 A | 12/1993 | Perkins et al. | |
| 5,350,137 A * | 9/1994 | Henley | 244/173.3 |
| 5,529,264 A | 6/1996 | Bedegrew et al. | |
| 5,743,492 A | 4/1998 | Chan et al. | |
| 6,061,562 A | 5/2000 | Martin et al. | |
| 6,729,582 B2 | 5/2004 | Beyer | |
| 7,240,879 B1 | 7/2007 | Cepollina et al. | |
| 7,293,743 B2 | 11/2007 | Cepollina et al. | |
| 7,388,559 B1 | 6/2008 | Kim | |
| 7,438,264 B2 | 10/2008 | Cepollina et al. | |

(Continued)

FOREIGN PATENT DOCUMENTS

| | | |
|---|---|---|
| CA | 2307778 A1 | 5/1999 |
| EP | 1027775 B1 | 8/2007 |

(Continued)

OTHER PUBLICATIONS

ESPA: The EELV Secondary Payload Adapter, CSA Engineering, Heavy Lift. Excess Capacity. Small Satellites. Mountain View, CA, downloaded Feb. 2012, 2 pages.

(Continued)

*Primary Examiner* — Tien Dinh
*Assistant Examiner* — Richard R Green
(74) *Attorney, Agent, or Firm* — TraskBritt

(57) ABSTRACT

Payload adapters for launch vehicles include a ring structure having an opening formed therein and at least a portion of an antenna assembly coupled to a circular sidewall of the ring structure at least partially within the opening of the ring structure. Satellite assemblies may include a payload adapter comprising a ring structure having a circular opening formed therein and an antenna assembly including a parabolic reflective dish formed within the circular opening. Launch stack systems may include a primary payload and a secondary payload adapter including an antenna dish integrally formed with a ring structure of the secondary payload adapter. Methods of forming a satellite assembly include positioning at least a portion of the antenna assembly within an opening formed in a ring-shaped payload adapter for a launch vehicle and coupling the at least a portion of the antenna assembly to the ring-shaped payload adapter.

24 Claims, 5 Drawing Sheets

(56) References Cited

U.S. PATENT DOCUMENTS

| | | |
|---|---|---|
| 7,513,459 B2 | 4/2009 | Cepollina et al. |
| 7,513,460 B2 | 4/2009 | Cepollina et al. |
| 7,866,607 B2 | 1/2011 | Benedict |
| 7,905,453 B2 | 3/2011 | Benedict et al. |
| 2003/0136881 A1 | 7/2003 | Beyer |
| 2005/0109878 A1* | 5/2005 | Cruijssen et al. .......... 244/173.1 |
| 2007/0029446 A1 | 2/2007 | Mosher |
| 2007/0125910 A1 | 6/2007 | Cepollina et al. |
| 2007/0138344 A1 | 6/2007 | Cepollina et al. |
| 2007/0164164 A1 | 7/2007 | Cepollina et al. |
| 2008/0011904 A1 | 1/2008 | Cepollina et al. |
| 2008/0149776 A1 | 6/2008 | Benedict |
| 2008/0149777 A1 | 6/2008 | Benedict et al. |
| 2009/0127399 A1* | 5/2009 | Mueller et al. ............. 244/173.1 |
| 2011/0097995 A1 | 4/2011 | Caplin et al. |
| 2011/0139936 A1 | 6/2011 | Allen et al. |
| 2011/0210208 A1 | 9/2011 | Ganguli et al. |
| 2012/0012711 A1 | 1/2012 | Ross et al. |
| 2012/0300071 A1* | 11/2012 | Do Carmo Miranda ...... 348/144 |

FOREIGN PATENT DOCUMENTS

| | | |
|---|---|---|
| EP | 1826920 A1 | 8/2007 |
| EP | 2407384 A1 | 1/2012 |
| WO | 9200223 A1 | 1/1992 |
| WO | 9923769 A1 | 5/1999 |
| WO | 2008079841 A1 | 7/2008 |
| WO | 2008079844 A2 | 7/2008 |

OTHER PUBLICATIONS

Goodwin et al., Evolved Expendable Launch Vehicle Secondary Payload Adapter, 2001 American Institute of Aeronautics & Astronautics Space 2001—Conference and Exposition, Albuquerque, NM, Aug. 28-30, 2001, 6 pages.

Lo et al., Secondary Payloads Using the LCROSS Architecture, American Institute of Aeronautics & Astronautics, Northrop Grumman Aerospace Systems, Redondo Beach, CA (2009) 8 pages.

Maly et al., Adapter Ring for Small Satellites on Responsive Launch Vehicles, American Institute of Aeronautics & Astronautics 7th Responsive Space Conference, Los Angeles, CA, Apr. 27-30, 2009, 10 pages.

MOOG CSA Engineering, Payload Adapters, ESPA—The EELV Secondary Payload Adapter, Mountain View, CA, downloaded Feb. 2012, 2 pages.

Schoenberg et al., The Demonstration and Science Experiments (DSX): A Fundamental Science Research mission Advancing Technologies that Enable Meo Spaceflight, Sep. 13, 2006, 13 pages.

* cited by examiner

US 8,789,797 B2

PAYLOAD ADAPTERS INCLUDING ANTENNA ASSEMBLIES, SATELLITE ASSEMBLIES AND RELATED SYSTEMS AND METHODS

TECHNICAL FIELD

Embodiments of the current disclosure relate generally to payload adapters that may be utilized in a launch stack of a launch vehicle. In particular, embodiments of the current disclosure relate to payload adapters including at least a portion of an antenna assembly formed within the payload adapters, satellite assemblies formed by payload adapters including antenna assemblies, launch stack systems including payload adapters having integral antenna assemblies, and related methods of forming satellite assemblies with payload adapters including antenna assemblies.

BACKGROUND

In order to increase the number of payloads that can be flown with reduced costs, spacecraft have been modified to work as a platform on which another or secondary payload can achieve access to space. The secondary payload may be a micro-satellite or a collection of sensors, electrical units, and antenna. There are two primary ways to accomplish this task, integrating the payload into the parent satellite or integrating the payload onto the parent satellite. One approach to integrating the payload into the parent satellite includes installation of the payload hardware during the manufacturing of the spacecraft. Units are mounted directly on internal equipment shelves and spacecraft subsystems are redesigned to accommodate the specific needs of the hosted hardware.

Another approach involves mounting a hosted payload onto the spacecraft. For example, small satellites intended to be launched as secondary, ride-share payloads may be mounted to Evolved Expendable Launch Vehicle (EELV) Secondary Payload Adapters (ESPAs). ESPAs are formed as a ring structure that include a plurality of circular ports formed at intervals around the ring for mounting smaller satellite components on the exterior of the ring. ESPAs are designed to mount to the launch stack of an EELV (typically, below the primary payload that is mounted in the EELV with a primary payload adapter). Upon deployment from the launch vehicle, the satellite components are separated from the ring structure of the ESPA. Other recent designs, such as the Demonstration and Science Experiments (DSX) Satellite and Lunar Crater Observation and Sensing Satellite (LCROSS), use the entire ESPA ring as part of the satellite structure, thereby using the multiple payload ports to attach the various satellite components. For these designs, the satellite components are retained on the outer surface of the ESPA ring in order to form a satellite that uses the entire ESPA ring and exterior components mounted to the outside of the ESPA ring as part of its structure.

BRIEF SUMMARY

In some embodiments, the present disclosure includes a payload adapter for a launch vehicle including a ring structure having an opening formed therein. The ring structure includes a first end and a second, opposing end and a circular sidewall extending between the first end and the second end. The payload adapter further includes at least a portion of an antenna assembly coupled to the circular sidewall of the ring structure proximate the first end. The at least a portion of the antenna assembly is positioned at least partially within the opening of the ring structure.

In additional embodiments, the present disclosure includes a satellite assembly including a payload adapter comprising a ring structure having a circular opening formed therein and an antenna assembly including a parabolic reflective dish formed within the circular opening and at least one feed extending from the reflective dish.

In yet additional embodiments, the present disclosure includes a launch stack system for a launch vehicle, including a primary payload and a plurality of secondary payload adapters. At least one secondary payload adapter of the plurality of secondary payload adapters comprises an antenna dish integrally formed with a ring structure of the at least one secondary payload adapter.

In yet additional embodiments, the present disclosure includes a method of forming a satellite assembly. The method including positioning at least a portion of the antenna assembly within an opening formed in a ring-shaped payload adapter for a launch vehicle and coupling an outer edge of the at least a portion of the antenna assembly to the ring-shaped payload adapter.

BRIEF DESCRIPTION OF THE SEVERAL VIEWS OF THE DRAWINGS

While the specification concludes with claims particularly pointing out and distinctly claiming that which is regarded as embodiments of the present disclosure, the advantages of embodiments of the disclosure may be more readily ascertained from the following description of embodiments of the disclosure when read in conjunction with the accompanying drawings.

DETAILED DESCRIPTION

The illustrations presented herein are not meant to be actual views of any particular material, apparatus, assembly system, or method, but are merely idealized representations that are employed to describe embodiments of the present disclosure. Additionally, elements common between figures may retain the same numerical designation for convenience and clarity.

Figure 1:
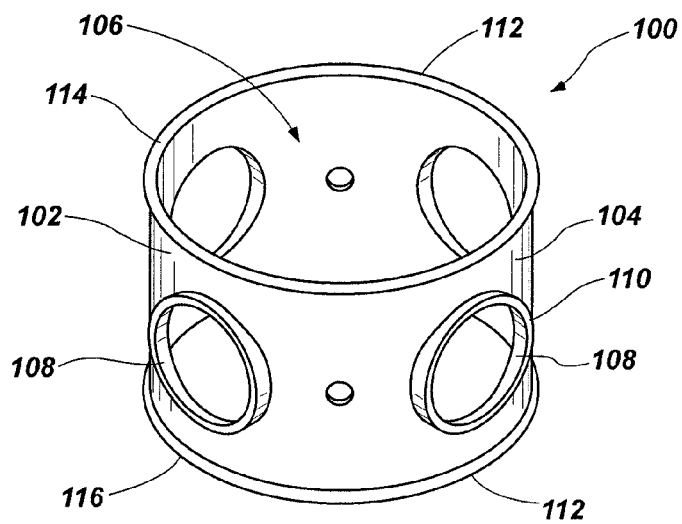
FIG. 1 is a perspective view of an embodiment of a payload adapter that may be used with embodiments of the present disclosure.

FIG. 1 is a perspective view of an embodiment of a payload adapter 100 that may be used with embodiments of the present disclosure. For example, the payload adapter 100 may comprise a Secondary Payload Adapter (ESPA) for an Evolved Expendable Launch Vehicle (EELV) (e.g., an ESPA Grande available from CSA Engineering of Mountain View, Calif.). As shown in FIG. 1, the payload adapter 100 may be formed as a ring structure 102 including a circular sidewall 104 forming an opening 106 therein. The ring structure 102 may include one or more payload ports 108 positioned around the ring structure 102 (e.g., at equal intervals). In some embodiments, the ring structure 102 may include four payload ports 108. In other embodiments, the ring structure 102 may include a various number of payload ports 108 (e.g., one, two, three, five, six or more payload ports). Each of the payload ports 108 may include a coupling feature 110 (e.g., a ring of threaded apertures configured to receive a plurality of bolts) such that additional components may be coupled to the outside of the ring structure 102 as discussed below in greater detail.

The payload adapter 100 includes coupling features 112 at a forward end 114 of the ring structure 102 and at an aft end 116 of the ring structure 102 (e.g., a ring of threaded apertures configured to receive a plurality of bolts, a flange formed at one or more ends of the ring structure 102 for receiving a mechanical clamp band, etc.) that are configured to couple to other components of a launch stack. For example, the coupling features 112 may be used to directly or indirectly couple the payload adapter 100 to launch vehicle adapters, other payload adapters, primary payloads, or combinations thereof. As used herein, the terms "forward" and "aft" are used in reference to portions of a payload adapter as it is mounted in a launch stack of a launch vehicle, for example, in the orientation shown in FIGS. 7 and 8.

Figure 2:
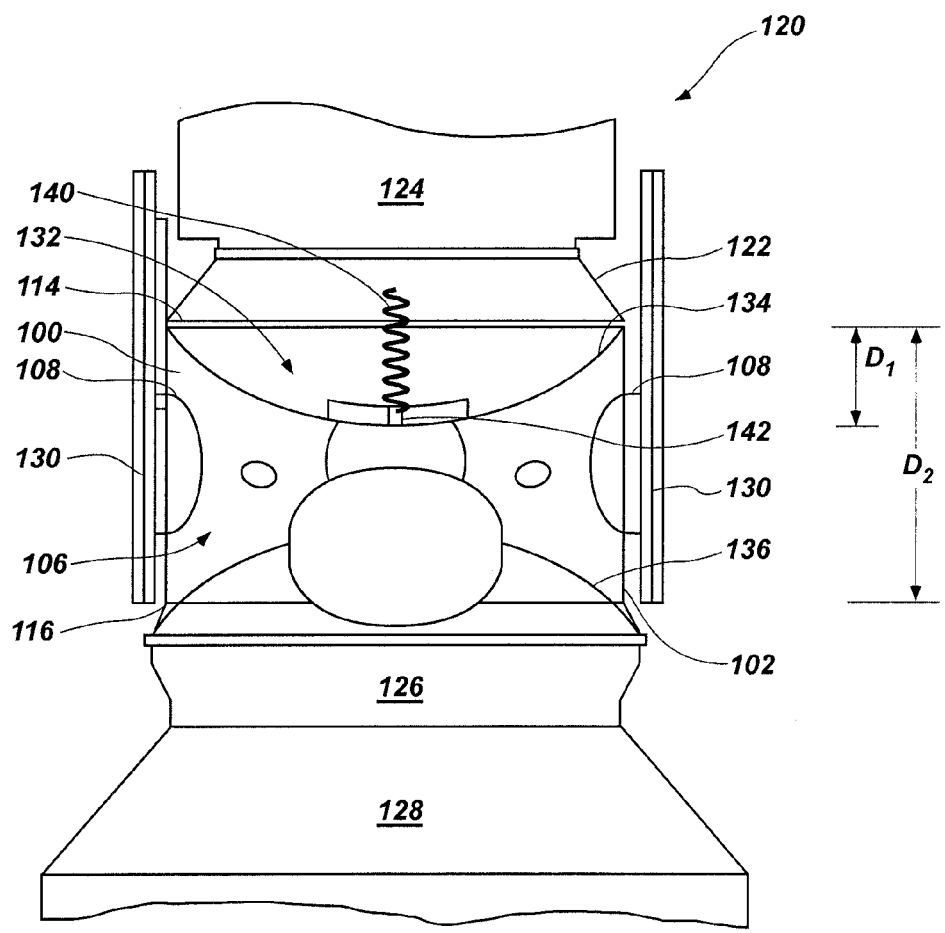
FIG. 2 is a partial cross-sectional view of a payload adapter including an antenna assembly in accordance with an embodiment of the present disclosure shown coupled to other components of a launch stack.

FIG. 2 is a partial cross-sectional view of a payload adapter (e.g., payload adapter 100) including an antenna assembly. In other words, the payload adapter is adapted to include an antenna assembly in order to form a satellite assembly (e.g. a stand-alone satellite assembly). For example, and as discussed below in further detail, the payload adapter may have at least a portion of an antenna assembly (e.g., a reflective dish, a structure having a feed extending therefrom, any other suitable structure for receiving and/or transmitting a signal or for supporting components of a antenna assembly that receive and/or transmit a signal) may be integrally foamed with the payload adapter. In other words, the portion of the antenna assembly is integrally formed with the payload adapter such that it is not further deployed from (e.g., separated from) the payload adapter during or after deployment from a launch vehicle. For example, a reflective dish of the antenna assembly may reside at partially or entirely within the payload adapter as the payload adapter is placed within a launch stack of a launch vehicle. After deployment from the launch vehicle, the reflective dish of the antenna assembly may continue to reside at the same, or at a substantially similar position, within the payload adapter as the payload adapter is utilized as a deployed satellite assembly. In other words, in order to function as a space-based antenna, the reflector dish of the antenna assembly need not be further deployed or separated from the payload adapter. However, as also discussed below, in some embodiments, the feed of the antenna assembly may be extendable relative to the dish in order to vary the functionality of the antenna assembly.

As shown in FIG. 2, the payload adapter 100 may be coupled to other components of a portion of a launch stack 120. For example, the payload adapter 100 may be coupled directly or indirectly (e.g., via a launch vehicle adapter 122) to a forward component 124 (e.g., a primary payload, another payload adapter, etc.). The payload adapter 100 may be coupled directly or indirectly (e.g., via a launch vehicle adapter 126) to an aft component 128 (e.g., a launch vehicle forward adapter coupling the launch stack 120 to the launch vehicle, another payload adapter, etc.).

One or more external components (e.g., solar panel arrays 130) may be coupled to the outer surface of the ring structure 102 of the payload adapter 100 at the payload ports 108. It is noted that while the embodiment of FIG. 2 illustrates solar panel arrays 130 coupled to the payload ports 108, any desired component may be coupled to the payload ports 108. For example, in some embodiments, components of a system formed within the payload adapter 100 may be mounted to the exterior of the payload adapter 100 to conserve space within the opening 106 of the payload adapter 100. In other embodiments, one or more components of another system (e.g., a separate satellite system) may be coupled to the payload ports 108 and may be deployed from (e.g., separated from) the payload adapter 100 after the payload adapter 100 has separated from the launch vehicle.

The payload adapter 100 may be formed to operate as a satellite once deployed from the launch vehicle. The payload adapter 100 may include one or more exterior components of a satellite (i.e., components of a satellite that are positioned external to or on the exterior of the satellite) formed (e.g., integrally formed) at least partially within the payload adapter 100. For example, the payload adapter 100 may have at least a portion of an antenna assembly 132 (e.g., a dish 134 of the antenna 132) formed at least partially within the payload adapter 100 at one or more ends of the payload adapter 100 (e.g., at the forward end 114). In some embodiments, the dish 134 of the antenna assembly 132 may be formed entirely within the opening 106 of payload adapter 100. For example, the depth $D_1$ of the dish 134 may be formed within the ring structure 102.

In some embodiments, the payload adapter 100 and the dish 134 may be sized such that the dish 134 and other components of a system formed at least partially within the payload adapter 100 are positioned within the ring structure 102. In other words, the depth $D_1$ of the dish 134 may be less than or equal to the depth $D_2$ of the payload adapter 100. As discussed below in greater detail, other components (e.g., control system, power supply, etc.) of an antenna system may be disposed within the payload adapter 100 along with the dish 134 (e.g., proximate a backside of the dish 134).

It is noted that while the embodiment of FIG. 2 illustrates the dish 134 formed entirely within the payload adapter 100, in other embodiments, a portion of the dish 134 or another portion of the antenna assembly 132 may at least partially extend from the payload adapter 100 (e.g., extend out the opening 106).

In some embodiments, the aft end 116 of the payload adapter 100 may include a conical adapter 136 extending at least partially into the opening 106. The conical adapter 136 may be utilized to provide space for components mounted proximate the aft end 116 of the payload adapter 100 in the launch stack 120, to mount components of the payload adapter 100, or combinations thereof. In some embodiments, a conical adapter 136 such as that shown on the aft end 116 may be used to form a portion of the dish of an antenna.

Figure 3:
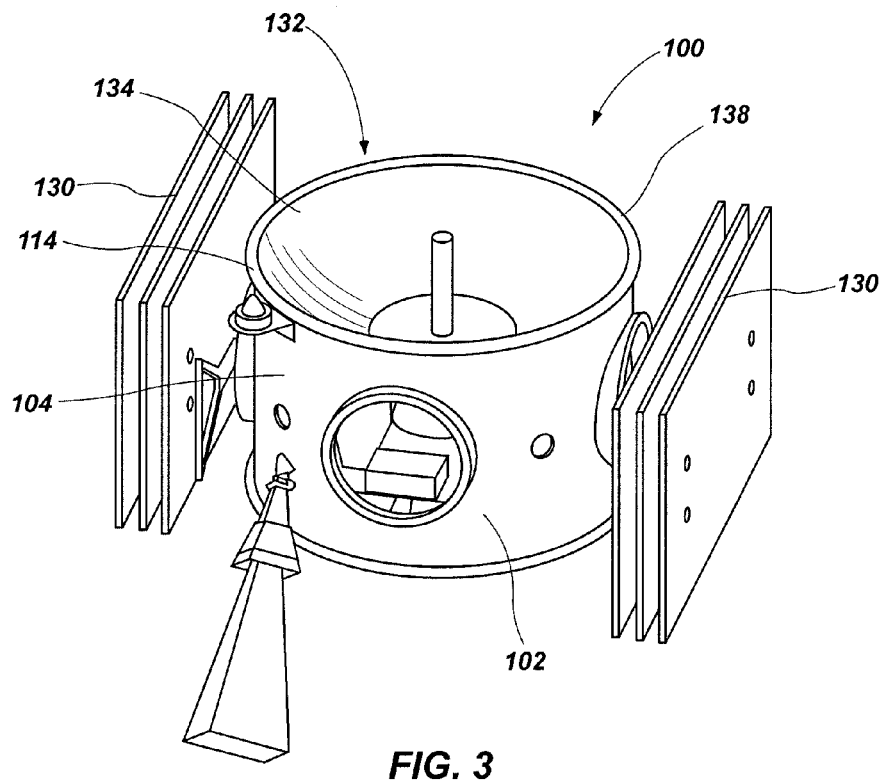
FIG. 3 is a perspective view of a payload adapter including an antenna assembly in accordance with an embodiment of the present disclosure.

As shown in FIG. 3, an outer edge of the dish 134 of the antenna assembly 132 may be coupled to the ring structure 102 of the payload adapter 100 at the forward end 114. For example, the outer edge of the dish 134 may be coextensive with the circular forward end 114 of the ring structure 102 (e.g., at an end of the circular sidewall 104). In some embodiments, the dish 134 may be formed at the forward end 114 of the payload adapter 100 such that the coupling features 112 at the forward end 114 may be utilized to couple the payload adapter 100 to another component of the launch stack 120 (FIG. 2). For example, the dish 134 may be coupled to the payload adapter such that a flange 138 formed at the forward end 114 including the coupling features 112 extends radially outward from the dish 134.

Referring back to FIG. 2, the antenna assembly 132 may include the dish 134 (e.g., a parabolic reflector dish having a concave surface for focusing signals of various wavelengths such as radio waves) and one or more feeds (e.g., a helical feed 140). In some embodiments, the antenna assembly 132 may be formed for use with a global positioning system (GPS). For example, the antenna assembly 132 may comprise the antenna assemblies described in U.S. Pat. No. 7,388,559 to Kim, the disclosure of which is hereby incorporated herein in its entirety by this reference. In some embodiments, and as described in U.S. Pat. No. 7,388,559, the dish 134 may include two portions (e.g., an inner and outer dish). In other embodiments, the antenna assembly 132 may comprise a non-reflector antenna (e.g., as discussed below with reference to FIG. 8), a patch antenna, a slotted waveguide antenna, or any other suitable type of space-based antenna.

The satellite formed by the payload adapter 100 and the antenna assembly 132 may be configured to direct at least a portion of the antenna assembly 132 (e.g., the dish 134) at the surface of the earth, away from the surface of the earth (e.g., into outer space), or combinations thereof.

In some embodiments, the antenna assembly 132 may include an actuator 142 (e.g., a linear actuator such as a screw actuator) for controlling the height that the feed 140 extends above the dish 134. The actuator 142 may extend the feed 140 outward from the dish 134 in a direction transverse (e.g., perpendicular) to at least a portion of the dish 134. For example, the feed 140 may extend along an axis (e.g., centerline) of the ring structure 102. The height of the feed 140 above the dish 134 may be used to adjust the focal length of the antenna assembly 132. For example, the feed 140 may be extended away from the dish 134 by the actuator 142 (i.e., increasing the height of the feed 140) to provide a relatively larger beam width than when height of the feed 140 is positioned by the actuator 142 at a relatively shorter height. Stated in another way, when the height of the feed 140 is adjusted by the actuator 142, the feed 140 may utilize (e.g., by receiving, transmitting, or both receiving and transmitting signals) different portions of the surface area of the dish 134 (e.g., different aperture sizes). For example, when the height of the feed 140 is lengthened by the actuator 142, the feed 140 may generate and receive signals using relatively more surface area (e.g., the entire surface area) of the reflective side of the dish 134. When the height of the feed 140 is decreased by the actuator 142, the feed 140 may generate and receive signals using relatively less surface area of the reflective side of the dish 134. Such variation in the focal length of the antenna assembly 132 may be utilized to select the ground footprint (i.e., an area of the surface of the earth) that the antenna assembly 132 may be in communication with (e.g., by receiving, transmitting, or both receiving and transmitting signals).

Figure 4:
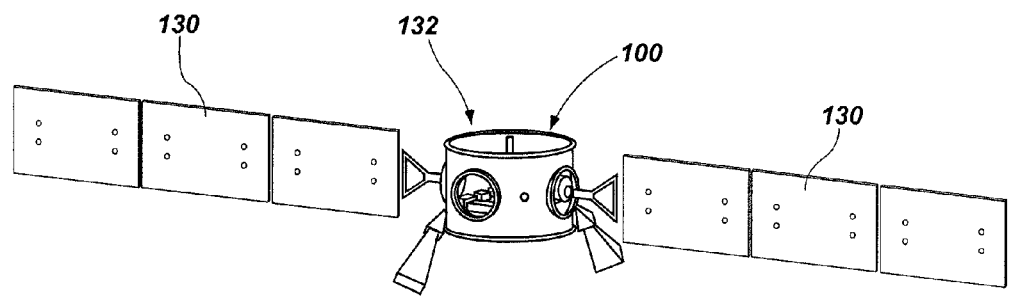
FIG. 4 is a perspective view of the payload adapter including the antenna assembly shown in FIG. 3 in a deployed configuration.

Referring again to FIG. 3, the payload adapter 100 is shown with the solar panel arrays 130 in a retracted position. The payload adapter 100 may be arranged in such a configuration, for example, when the payload adapter 100 is positioned in the launch stack 120 (FIG. 2) of a launch vehicle and immediately after deployment from the launch vehicle. As shown in FIG. 4, after deployment, the solar panel arrays 130 may be expanded into a deployed configuration (e.g., expanded by one or more actuators) in order to assist in powering components of the payload adapter 100 including the antenna assembly 132.

Figure 5:
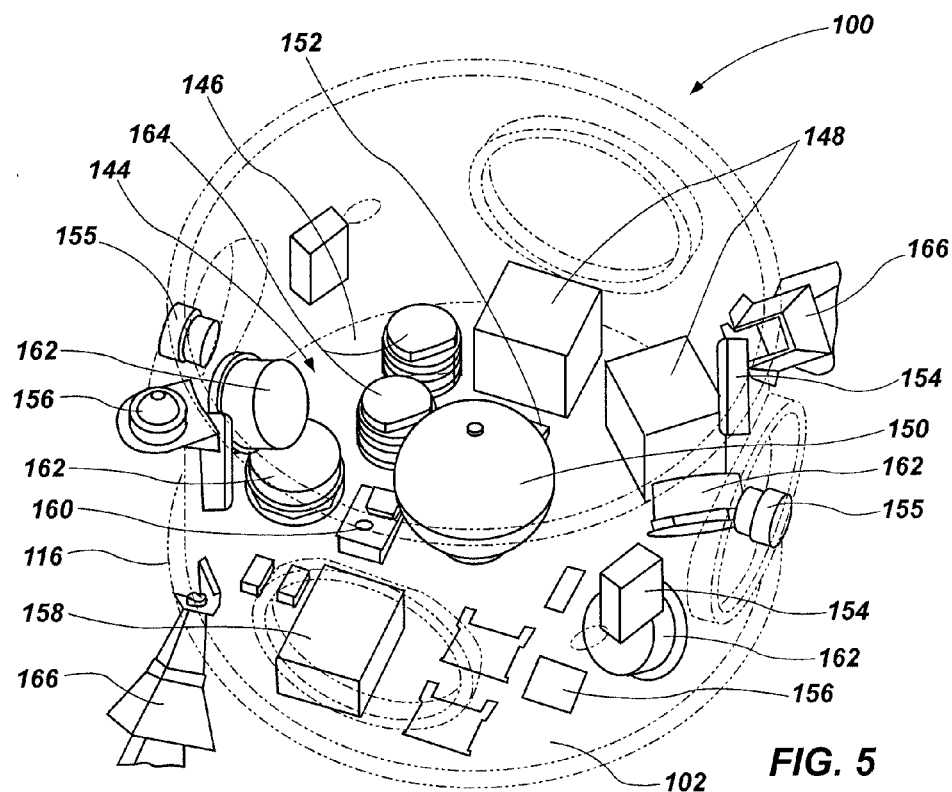
FIG. 5 is a partial cross-sectional view of a payload adapter including an antenna assembly illustrating exemplary internal components in accordance with another embodiment of the present disclosure.

FIG. 5 is a partial cross-sectional view of a payload adapter including an antenna assembly (e.g., payload adapter 100 and antenna assembly 132) (FIG. 2) illustrating exemplary internal components of the payload adapter 100 and antenna assembly 132. As shown in FIG. 5, the payload adapter 100 may include an aft deck 144 of internal components that are coupled to a support surface 146 formed within the ring structure 102 of the payload adapter 100 (e.g., a support surface 146 formed proximate to the aft end 116 of the payload adapter 100 such as a flat plate adapter). In some embodiments, the components of the payload adapter 100 and antenna assembly 132 coupled to the aft deck 144 or to the ring structure 102 may include avionics 148, a fuel tank 150, peak power trackers 154 and solar array drive assemblies (SADAs) 155 for use with the solar panel assemblies 130 (FIG. 4), a communications assembly 156 (e.g., an S band communications assembly to communicate with components of the payload adapter 100 to a terrestrial or extraterrestrial site), one or more batteries assemblies 158, and an auxiliary electronic box 160.

In some embodiments, the payload adapter 100 may include one or more components for controlling position of the payload adapter 100 after it is deployed from the launch vehicle. For example, the payload adapter 100 may include one or more reaction wheel assemblies (RWAs) 162 for controlling attitude of the payload adapter 100. In other embodiments, the payload adapter 100 may include other actuators (e.g., one or more thrusters or jets) for controlling attitude of the payload adapter 100. The internal components of the payload adapter 100 may include sensors for assisting with controlling attitude of the payload adapter 100 such as, for example, a tri-axis magnetometer (TAM) 152 and one or more miniature inertial measurement units (MIMU) 164 for measuring, for example, the velocity, orientation, and gravitational forces of the payload adapter 100. In some embodiments, the payload adapter 100 may include one or more attitude sensors 166 (e.g., star trackers) mounted on the exterior surface of the ring structure 102 of the payload adapter 100.

Figure 6:
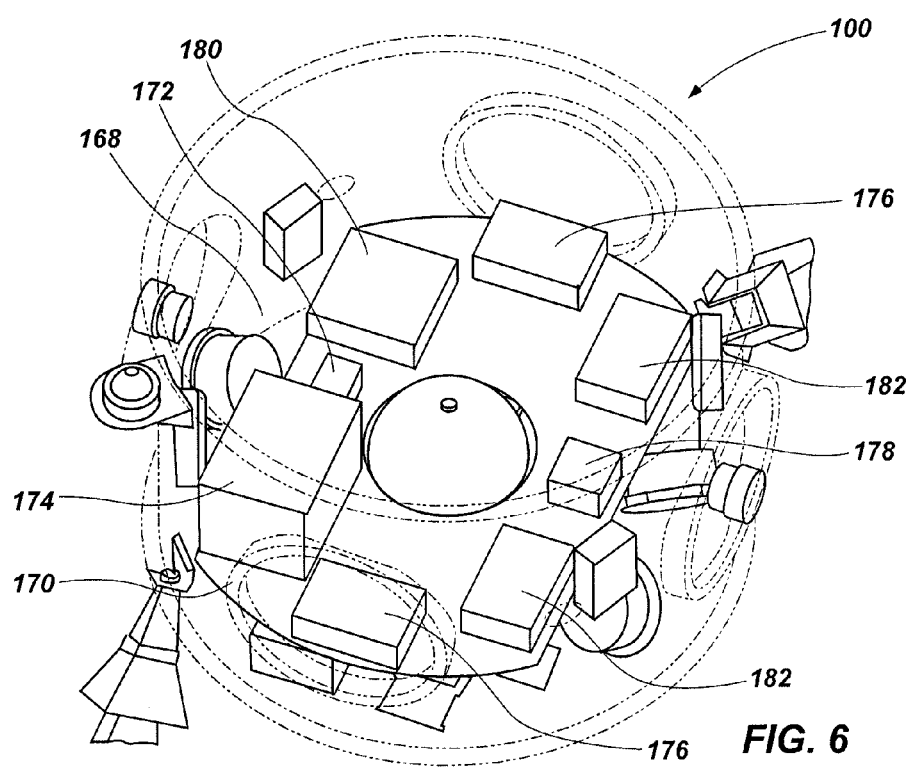
FIG. 6 is a partial cross-sectional view of the payload adapter including the antenna assembly shown in FIG. 5 illustrating additional exemplary internal components.

FIG. 6 is a partial cross-sectional view of the payload adapter 100 and the antenna assembly 132 shown in FIG. 5 showing additional exemplary internal components of the payload adapter 100 and antenna assembly 132. As shown in FIG. 6, the payload adapter 100 may include a middle deck 168 of components that are coupled to another support surface 170 formed within the payload adapter 100. In some embodiments, the components of the payload adapter 100 and antenna assembly 132 (FIG. 2) coupled to the middle deck 168 may include a diplexer 172 (e.g., an L-band diplexer), mission data unit 174, one or more high power amplifiers (HPAs) 176, a time standard 178, a frequency synthesizer 180, and one or more intermediate power amplifiers 182.

Figure 7:
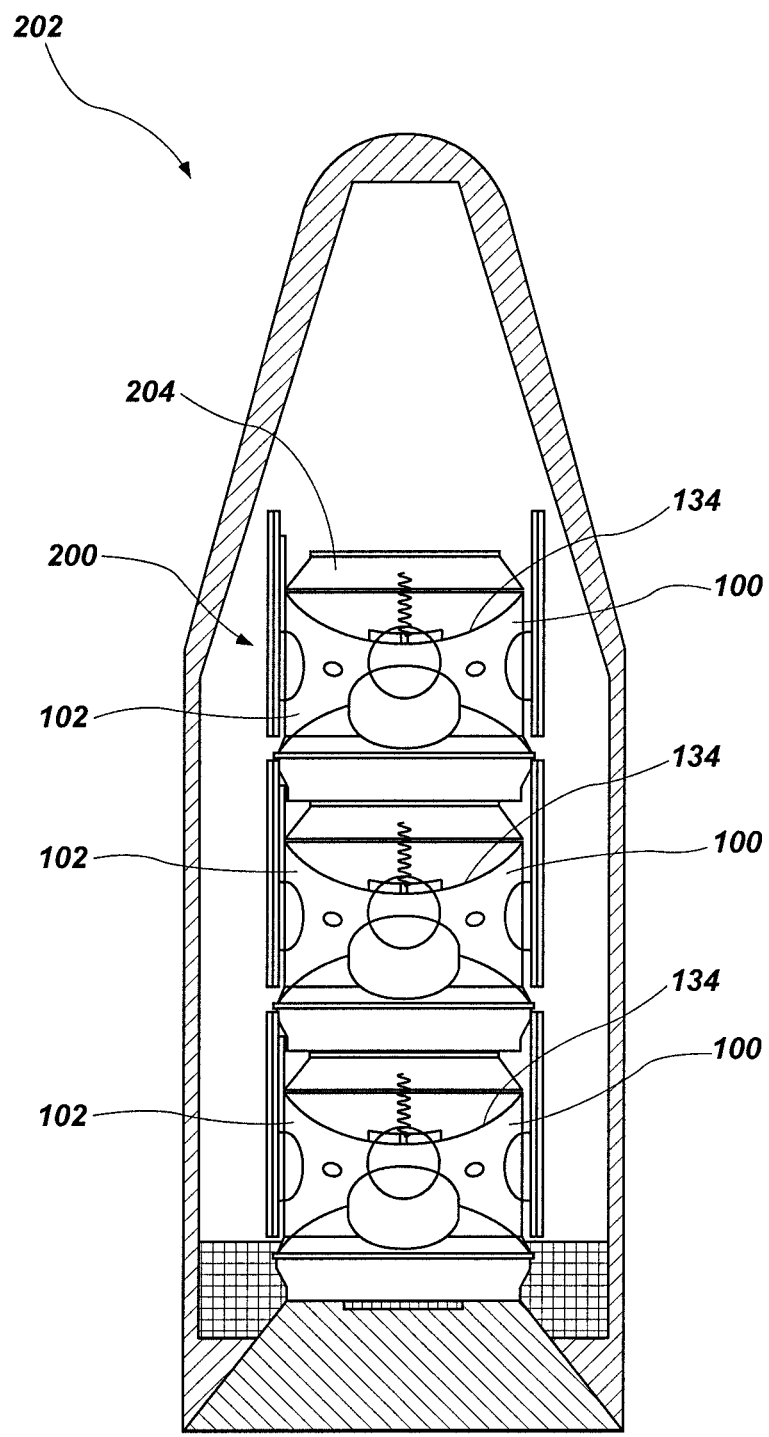
FIG. 7 is a partial cross-sectional view of a launch stack of payload adapters in accordance with another embodiment of the present disclosure positioned inside a launch vehicle.

FIG. 7 is a partial cross-sectional view of a launch stack 200 of payload adapters (e.g., one or more payload adapters similar to payload adapter 100 discussed above) inside a launch vehicle 202. As shown in FIG. 7, multiple payload adapters 100 that include an antenna assembly 134 may be stacked in the launch stack 200 using, for example, one or more launch vehicle adapters 204. For example, the payload adapters 100 may be coupled to one or more adjacent payload adapters 100 and to the base of the launch vehicle 202 by the launch vehicle adapters 204. The launch vehicle adapters 204 may be coupled to adjacent launch vehicle adapters 204, to the payload adapters 100, and to the launch vehicle 202 by coupling features that may be separated when it is desirable to deploy one or more components of the launch stack 200 from the launch vehicle 202. For example, the launch vehicle adapters 204 may be coupled to adjacent launch vehicle adapters 204, to the payload adapters 100, and the launch vehicle 202 by clamp bands that may be released upon deployment (e.g., by a controllable release device such as a pyrotechnic release device).

Figure 8:
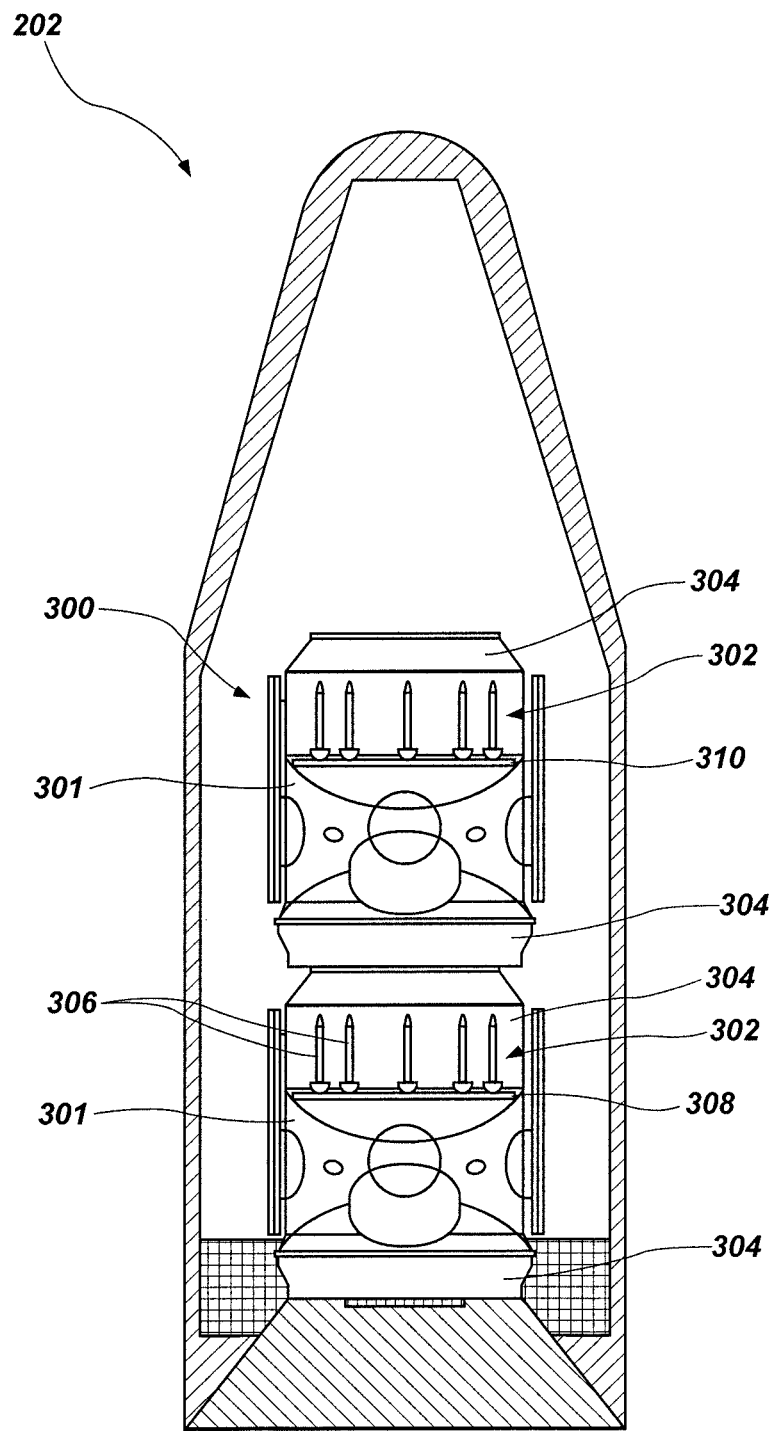
FIG. 8 is a partial cross-sectional view of a launch stack of payload adapters in accordance with another embodiment of the present disclosure positioned inside a launch vehicle.

FIG. 8 is a partial cross-sectional view of a launch stack 300 of payload adapters (e.g., one or more payload adapters somewhat similar to payload adapter 100 discussed above) inside a launch vehicle 202. As shown in FIG. 8, multiple payload adapters 301 including an antenna assembly 302 may be stacked in the launch stack 300 using, for example, one or more launch vehicle adapters 304 that may be similar to the launch vehicle adapters 204 discussed above. As mentioned above, in some embodiments, the antenna assembly 302 may comprise a non-reflector antenna. For example, the antenna assembly 302 may include multiple feeds 306 coupled to a support surface 308 (e.g., a planar support surface) in order to form an antenna (e.g., a GPS antenna). The launch vehicle adapters 304 at the forward end 310 of the payload adapters 301 may be sized to fit at least a portion of the feeds 306 therein. As above, at least a portion of the antenna assembly 302 (e.g., the support surface 308 and a base portion of the feeds 306) may be formed within the payload adapter 301.

The launch vehicle adapters 304 coupled to the forward end 310 of the payload adapters 301 may be sized to accommodate the portion of the antenna assembly 302 that extends exterior to the payload adapters 301 (e.g., the portion not formed within the payload adapters 301). For example, the launch vehicle adapters 304 coupled to the forward end 310 of the payload adapters 301 may be sized to accommodate at least a portion of the one or more feeds 306 extending from the support surface 308.

As above, the payload adapters 301 may be coupled to one or more adjacent payload adapters 100, 301 and to the base of the launch vehicle 202 by the launch vehicle adapters 304. The launch vehicle adapters 304 may be coupled to adjacent launch vehicle adapters 304, to the payload adapters 100, 301, and to the launch vehicle 202 by coupling features that can be separated when it is desirable to deploy one or more components of the launch stack 300 from the launch vehicle 202.

In view of the above, embodiments of the present disclosure may be particularly useful in providing an antenna that is part of the payload adapter (e.g., an ESPA ring). The payload adapter with the included antenna may be housed within the height of the ESPA ring enabling a lower overall profile and enable relatively more ESPA rings to be stacked in a launch vehicle, as compared to primary satellite assemblies that are incompatible with an ESPA ring or satellite assemblies including antenna assemblies that must be deployed or are otherwise separated from their launch housings after deployment from a launch vehicle. For example, an antenna assembly that is formed at least partially within the ring structure of a payload adapter may enable the payload adapters to be stacked relatively more close together (e.g., the payload adapters may exhibit a lower profile) as compared to other satellite assemblies that do not include an antenna assembly formed within a payload adapter (e.g., primary satellites that are incompatible with a payload adapter such as an ESPA or satellites having antennas that need to be deployed from a housing structure such as an ESPA ring).

While the present disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure includes all modifications, equivalents, legal equivalents, and alternatives falling within the scope of the disclosure as defined by the following appended claims.

What is claimed is:

1. A payload adapter for a launch vehicle, comprising:
a ring structure having an opening formed therein, the ring structure comprising:
a first end and a second, opposing end; and
a circular sidewall extending between the first end and the second end;
at least a portion of an antenna assembly attached to the circular sidewall of the ring structure proximate the first end, the at least a portion of the antenna assembly being positioned at least partially within the opening of the ring structure, the at least a portion of an antenna assembly adapted to be attached to the circular sidewall of the ring structure before and after deployment of the ring structure from the launch vehicle.

2. The payload adapter of claim 1, wherein the payload adapter includes at least one coupling feature at one of the first end and the second end, the at least one coupling feature configured to couple the payload adapter to at least one adjoining structure within a launch vehicle.

3. The payload adapter of claim 2, wherein the at least one coupling feature is positioned proximate the at least a portion of the antenna assembly and is configured to couple with at least one of a primary payload and an adjacent payload adapter with a launch vehicle adapter.

4. The payload adapter of claim 1, further comprising at least one feed coupled to and extending from the at least a portion of the antenna assembly in a direction toward the first end.

5. The payload adapter of claim 4, wherein the at least one feed comprises at least one helical feed positioned proximate a center of the at least a portion of the antenna assembly, the at least one helical feed extending along an axis of the ring structure.

6. The payload adapter of claim 5, further comprising an actuator configured to alter a distance that the at least one helical feed extends from the at least a portion of the antenna assembly.

7. The payload adapter of claim 1, wherein the at least a portion of the antenna assembly comprises a parabolic, reflective dish of the antenna assembly and further comprising at least one feed coupled to and extending from the reflective dish in a direction toward the first end.

8. The payload adapter of claim 7, wherein an outer edge of the reflective dish is coupled to the circular sidewall of the ring structure at the first end.

9. The payload adapter of claim 7, wherein an intersection of an outer edge of the reflective dish and a circular edge of the circular sidewall form the first end of the ring structure and wherein the first end of the ring structure further comprises a flange extending radially outward from the outer edge of the reflective dish, the flange configured and positioned to couple the payload adapter to at least one adjoining structure within a launch vehicle.

10. The payload adapter of claim 1, wherein the at least a portion of the antenna assembly comprises a planar surface.

11. The payload adapter of claim 10, further comprising a plurality of helical feeds extending from the planar surface of the at least a portion of the antenna assembly in a direction toward the first end.

12. The payload adapter of claim 1, wherein a parabolic reflective dish of the antenna assembly is located entirely between the first end and the second end of the ring structure.

13. A satellite assembly, comprising:
a payload adapter comprising a ring structure having a circular opening formed therein, a first end, and a second, opposing end; and
an antenna assembly comprising:
a parabolic reflective dish formed within the circular opening, wherein an entirety of the parabolic reflective dish is positioned between the first end and the second, opposing end of the ring structure of the payload adaptor, the parabolic reflective dish adapted to be positioned within the ring structure before and after deployment of the antenna assembly from a launch vehicle; and
at least one feed extending from the reflective dish.

14. The satellite assembly of claim 13, wherein the payload adapter is configured to couple to at least another satellite assembly in a launch stack.

15. The satellite assembly of claim 13, further comprising an actuator configured to alter a distance that the at least one feed extends from the reflective dish.

16. The satellite assembly of claim 13, further comprising at least one attitude control system disposed within the payload adapter.

17. The satellite assembly of claim 13, further comprising two expandable solar panels array coupled to an outer surface of the payload adapter.

18. A launch stack system for a launch vehicle, comprising:
a primary payload; and
a plurality of secondary payload adapters coupled to the primary payload, at least one secondary payload adapter of the plurality of secondary payload adapters comprising an antenna dish integrally formed with a ring structure of the at least one secondary payload adapter, the ring structure having an opening formed therein and comprising a first end, a second, opposing end, and a circular sidewall extending therebetween, the antenna dish configured to be secured to the ring structure proximate the first end before and after deployment of the at least one secondary payload adapter from the launch vehicle.

19. The launch stack system of claim 18, wherein the at least one secondary payload adapter is coupled to at least one of the primary payload and an adjacent secondary payload adapter of the plurality of secondary payload adapters with a launch vehicle adapter, and wherein a portion of the antenna dish of the at least one secondary payload adapter is positioned at an interface between a forward end of the at least one secondary payload adapter and the launch vehicle adapter.

20. The launch stack system of claim 18, wherein each secondary payload adapter of the plurality of secondary payload adapters comprises an antenna dish integrally formed with a ring structure of the secondary payload adapter.

21. A method of forming a satellite assembly, the method comprising:
positioning at least a portion of an antenna assembly within an opening formed in a ring shaped payload adapter for a launch vehicle comprising a first end, a second, opposing end, and a circular sidewall extending therebetween; and
coupling an outer edge of the at least a portion of the antenna assembly to the ring shaped payload adapter proximate the first end of the ring shaped payload adapter such that the antenna assembly is configured to be positioned within the ring shaped payload adapter before and after deployment of the ring shaped payload adapter from the launch vehicle.

22. The method of claim 21, further comprising positioning at least one feed extending along an axis of the ring-shaped payload adapter.

23. The method of claim 22, wherein coupling an outer edge of the at least a portion of the antenna assembly to the ring-shaped payload adapter comprises coupling the outer edge of the at least a portion of the antenna assembly at a first end of the ring-shaped payload adapter.

24. The method of claim 23, wherein positioning at least a portion of the antenna assembly within an opening formed in a ring-shaped payload adapter comprises positioning a parabolic dish at a forward end of the ring-shaped payload adapter such that the parabolic dish extends from the forward end into the ring-shaped payload adapter.

* * * * *